United States Patent [19]
Falchi

[11] Patent Number: 5,178,504
[45] Date of Patent: Jan. 12, 1993

[54] PLUGGED FASTENING DEVICE WITH SNAP-ACTION LOCKING FOR CONTROL AND/OR SIGNALLING UNITS

[75] Inventor: Fiorino Falchi, Turin, Italy

[73] Assignee: CGE Compagnia Generale Elettromeccanica Spa, Milan, Italy

[21] Appl. No.: 707,112

[22] Filed: May 29, 1991

[30] Foreign Application Priority Data

May 29, 1990 [IT] Italy ................. 21267/90[U]

[51] Int. Cl.⁵ ................ F16B 21/00; H01H 1/52; H01H 3/20; H01H 9/00
[52] U.S. Cl. ................... 411/553; 411/354; 200/296; 200/322
[58] Field of Search ............ 411/349, 549–553, 411/348; 200/296, 321, 322, 324, 325

[56] References Cited
U.S. PATENT DOCUMENTS 3,631,377 12/1971 Ball ........................... 411/348
3,675,280 7/1972 Winslade ..................... 411/552
3,912,411 10/1975 Moffat ....................... 411/552
4,198,080 4/1980 Carpenter ................... 411/348

FOREIGN PATENT DOCUMENTS 105387 4/1984 European Pat. Off. ........... 411/553
199344 10/1986 European Pat. Off. ........... 411/553

Primary Examiner—Neill R. Wilson
Attorney, Agent, or Firm—Helfgott & Karas

[57] ABSTRACT

A snap-action fastening device comprises an operative unit to be fastened to a switchboard and a flange unit having seats receiving fins of a member containing control and signalling units and adapted to be snapped on and fastened to an elongated stem of the operative unit. The flange unit has a rotatable lever having a central bore provided on a surface thereof with inwardly protruding teeth engageable in elongated slots formed in an end portion of the stem and retained in recesses extending transversely of the slots.

12 Claims, 2 Drawing Sheets

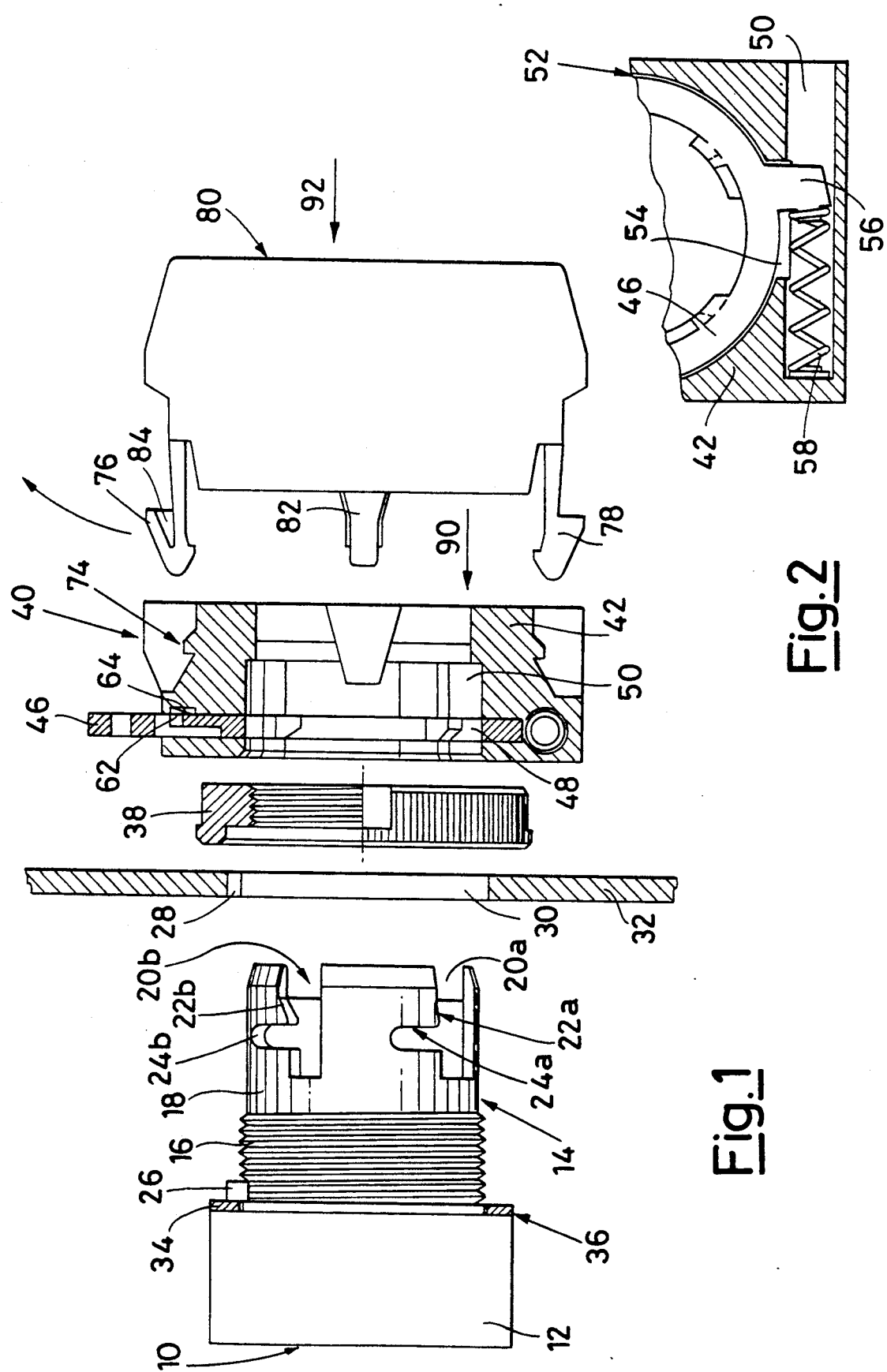

PLUGGED FASTENING DEVICE WITH SNAP-ACTION LOCKING FOR CONTROL AND/OR SIGNALLING UNITS

BACKGROUND OF THE INVENTION

The present invention relates to a snap-action fastening device for control and/or signalling units provided with snap-action locking means disengageable through the action of a tool, such as a screwdriver. Devices mountable on a switchboard and containing push-buttons and control levers, as well as signalling means, such as lamps, has been well known for a long time. Among such known devices are and largely used those disclosed and claimed in the European Patents No. 0,105,387 and 0,199,344 granted to the applicant of the present application, to which reference is made. These devices are of the kind having fastening means located at the rear of the switchboard and comprise a first external member protruding from a switchboard into which is bayonett inserted, a second member provided with a fastening ring nut to fasten the device to the switchboard to prevent unscrewing of the same by operating from the external side of the switchboard. The second member, located at the rear side of the board can receive a plugged flange at which may be mounted control and/or signalling units which, according to the European Patent No. 0,105,387, are fastened by means of screws engageable in threaded holes in the flange and, according to the European Patent No. 0,199,344 are axially inserted into protruding fingers of the flange itself.

The above mentioned devices operate rather well, but are suited only for large size and high price push-buttons mountable only in relatively large and high cost control boards where both the large size and the high cost can be justified.

However, the problem of providing smaller size and less expensive devices to be used in smaller and less expensive control boards and being fastenable at the rear side of a switchboard and capable of bearing control and/or signalling units easily mountable thereon was not resolved.

SUMMARY OF THE INVENTION

It is an object of the present invention to provide a snap-action fastening device suitable for smaller switchboards. It is a further object of the present invention to provide a fastening device insertable from a front side into the hole in a switchboard and fastenable by means of a ring nut on the rear side of the switchboard.

It is yet another object of the invention to provide a fastening device capable of housing control and/or signalling units mountable therein.

These and other objects are attained by a plugged fastening device insertable from the front external side of a switchboard and fastenable thereto through, for example, a ring nut engageable with a threaded stem protruding from the operative unit to the inside of a control switchboard, of which the board is a portion, said stem being provided on the internal side with respect to the switchboard with at least a slot adapted to house at least a protrusion resilient movably connected to a flange insertable in said stem and disengageable therefrom by means of a tool, said flange being able to house one or more control and/or signalling units.

Preferably, the stem is provided on the internal side thereof with a plurality of slots housing in a plugged manner, a corresponding plurality of protrusions resiliently connected to the flange insertable in the stem and disengageable therefrom with the help of a tool.

Specifically, two slots and two protrusions may be provided. In an embodiment, three slots and three protrusions may be provided. In another embodiment, four slots and four protrusions may be provided. Preferably, the protrusions, engageable in said slots, are provided as inwardly protruding in a hollow passage. The lever is arranged in a first position by resilient means and is able to be arranged at will in a second position through a manual operation with the help of a tool, such as a screwdriver.

In a preferred embodiment of the present invention each slot formed in the stem of the operative unit is provided with a first bevelled protrusion which engages with and moves one of the inwardly extending protrusions of the hollow passage of the lever, by overcoming the force of resilient means wherein a recess is provided housing the respective protrusion when it enters the recess under the thrust of the resilient means.

Also more preferably, the flange is provided with a hollow passage coaxial with the passage extending through the lever and provided with protrusions in the number corresponding to the number of the teeth of the lever entering the corresponding slots in the stem to operate as a guide for the flange with respect to the stem.

Specifically, the teeth protruding from the passage of the lever are offset in position with respect to the protrusions in the passage of the flange but coincide with those protrusions under the under the action of the bevelled protrusion of said stem and return to the not offset starting position when, after overcoming said bevelled protrusions they enter the subsequent recesses.

The flange is provided at a location opposed to that of insertion on the stem, with seats to plug in control and/or signalling units. More specifically, the slots consist of seats peripherically arranged in said flange and provided on the bottom with at least a tooth engaging fins laterally protruding from members containing said control and/or signalling units.

In a most preferred embodiment of the present invention the peripheral flange slots are in number of three pairs to house three members, at most, of said control and/or singalling units.

The features and the advantages of the present invention have been hereabove defined, however, other features and advantages will be explained by the following detailed description of an embodiment, not to be altogether construed in a limiting way, to be considered in conjunction with the drawings.

BRIEF DESCRIPTION OF THE DRAWINGS

FIG. 1 is a partially sectioned exploded side view of a fastening device according to the present invention;

FIG. 2 is a partial sectional view of a flange of the device according to the present invention, showing the element operating a lever for engaging protrusions with the slots in a stem of the operative unit;

DETAILED DESCRIPTION OF THE PREFERRED EMBODIMENT

Figure 3:
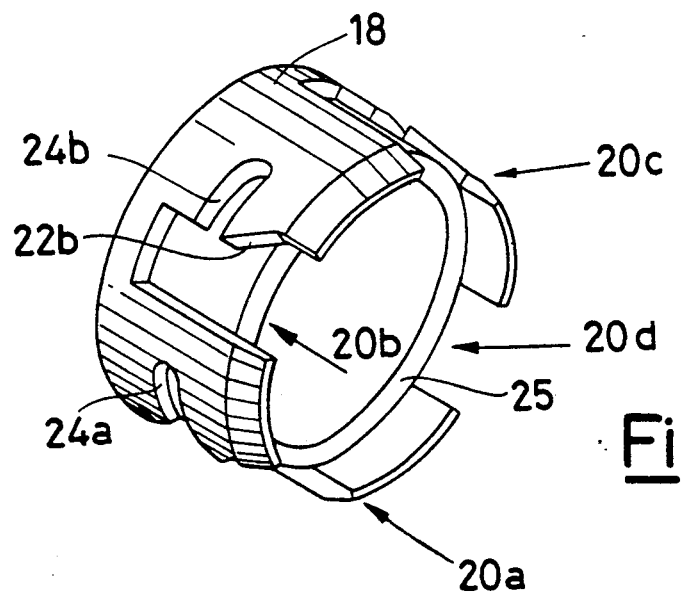
FIG. 3 is a partial perspective view showing the stem of the device according to the present invention.

Referring to the figures, it is seen that a fastening device according to the present invention consists of an operative unit 10 comprising an enlarged head 12, a cylindrical stem 14 comprised of a first threaded portion 16 merging into a substantially smooth portion 18 from which an end portion starts, which has a plurality of slots 20a, 20b, 20c, 20d, arranged in substantially axial direction and each formed with a protrusion 22a-22d followed by a recess 24a-24d. Slots 20a-20d are partially closed inside the stem 14 by a ferrule 25 provided for supporting and guiding thereinto of the protrusions or teeth. Between the enlarged head 12 and the cylindric stem 14 can be interposed a tooth 26 engageable in a corresponding notch 28 formed in the circumferential edge of a circular hole 30 extending through a switchboard 32 on which can be fastened the operative unit 10. Between the enlarged head 12 and the switchboard 32 can be interposed a gasket 34 which is pressed between head 12, board 32 and a rim 36 near the threaded portion 16 in order to assure a liquid seal between the operative unit 10 and the switchboard 32. An internally threaded ring nut 38 fastens the operative unit 10 to the switchboard 32. On the substantially smooth portion 18 of the cylindrical stem 14 is inserted a flange 40 consisting of a hollow body 42 having in a transversal slot 44 which houses a lever 46 provided with a circular opening 48, coaxial with a circular opening 50 provided in the body 42 of the flange 40, and suitable to receive the substantially smooth portion 18 of stem 14. The lever 46 housed in the slot 44 abuts against a substantially semicircular base 52 thereof with the possibility of rotating about the common axis of the circular openings 48 and 50 and of the stem 14. The semicircular base 52 is provided with a slot 54 through which protrudes a finger 56 of lever 46 in the position depicted in the FIGS. 2 and 4. The lever 46 itself is provided on the upper side with a tang 62 having a small tooth engaging in a slot 64 in which it may freely enter at the entering of the lever 46 into the slot 44. Tang 62 does not come out of slot 64 thus, assuring the proper arrangement of the lever 46 in body 42 of the flange 40.

Figure 4:
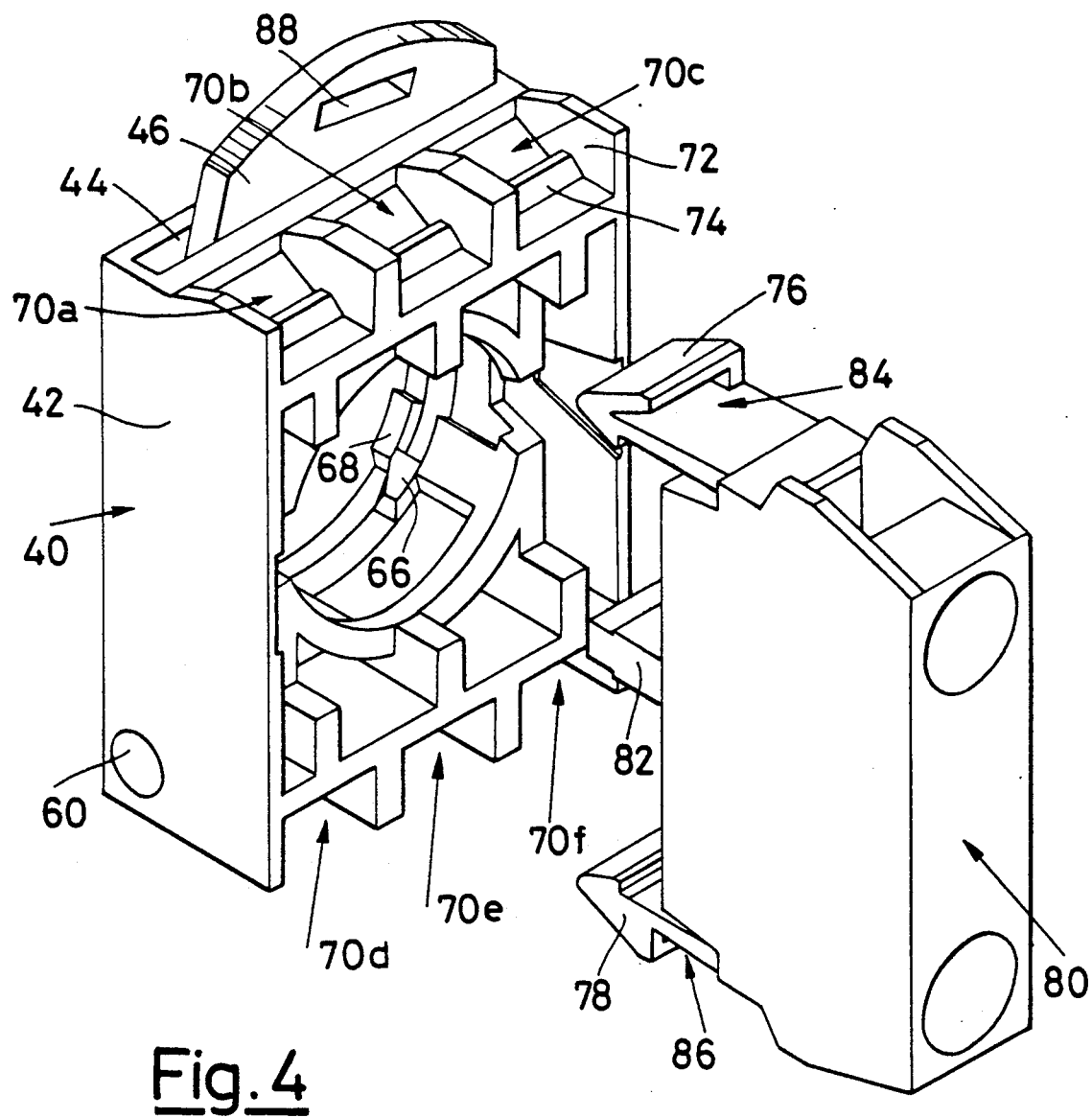
FIG. 4 is a perspective view of a the flange and of a member of control and/or signalling unit according to the present invention, depicting the way of insertion of unit members in the flange.

The lever 46 at its circular opening 48 is provided with protrusions such as an inwardly extending protrusion 66 (FIG. 4) and flange body 42 at the circular opening 50 is provided on the internal edge thereof with protrusions, such as an inwardly extending protrusion 68, said protrusions entering the corresponding slots 20a-20d of the cylindrical stem 14 of the operative unit 10. The flange 40 is provided at the rear side thereof with seats in the form of slots 70a-70f (FIG. 4). Slots 70a-70f are separated by lateral walls 72 and each provided on the bottom thereof with a tooth 74, to engage fins 76 and 78 protruding from a member 80 containing both control and signalling units. In FIGS. 1 and 4, member 80 is a control unit provided with an actuating stem 82 which is engaged by a mechanism extending out from the operative unit 10. Of course, more than one members of the control and/or signalling units may be provided, for example three, which would engage the respective pairs of lateral slots 70a and 70d, 70b and 70e, 70c and 70f in the flange 40.

Fins 76 and 78 are formed with respective slots 84 and 86 provided for disengaging purposes, as will be described below. Also the lever 46 of the flange 40 is provided with a window 88 to receive a tool, such as a screwdriver, for disengaging the reliefs 66, as will be described herein below. The operation of the device is as follows:

When a push-button, the of the kind depicted in the figures, is desired to be mounted, operative unit 10 is introduced into hole 30 of switchboard 32 so that the enlarged head 12 abuts against the switchboard 32, introducing the tooth 26 in the notch 28 of the hole 30. The ring nut 38 is then inserted on the cylindrical stem 14 for complete screwing on the first threaded portion 16, fastening the operative unit 10 to the switchboard 32. Having the operative unit so fastened, it is possible to insert the flange 40 on the substantially smooth portion 18 of the cylindrical stem 14, moving it substantially in the direction of the arrow 90 (FIG. 1), orienting the body 42 of the flange 40 so that the protrusions 68 enter the slots 20a-30d of the stem 14. In turn, the reliefs or teeth 66 provided at the circular opening 48 of the lever 46, meet entering the slots 20a-20d, the bevelled protrusions 22a-22d and while thrusting on those protrusions make lever 46 rotate in such a way that the finger 56 overcomes the force of the spring 58 (FIG. 2). Once the teeth 66 passed over the bevelled protrusions 22a-22d they push the same into the recesses 24a-24d assuring a plug fastening of the flange 40 on the operative unit 10. Once the flange 40 has been fastened to the operative unit 10, it can house one or more members 80 of control and/or signalling units which are moved in the direction of the arrow 92 till the fins 76 and 78 pass with their internal teeth over the teeth 74 in the lateral slots 70a-70c of the flange 40, thus assuring a complete anchoring of the member 80 to the flange 40.

Of course, mounting operation of the members 80 on the flange 40 can be carried out before flange 40 has been inserted on the stem 14 of the operative unit 10 without however departing from the scope of the invention.

To disassemble members 80 from the flange 40 and the flange 40 from the operative unit 10, it is possible to proceed in the following way:

One of the fins 76 or 78 is lifted by introducing a screwdriver in one of their slots 84 or 86. Once one of the fins has been lifted, member 80 comes off from the flange 40. Then a screwdriver is inserted in the window 88 of the lever 46, rotating it clockwise so that the protrusions 66 of the lever align with the protrusions 68 of the flange, thus clearing protrusions 66 from recesses 24a-24d and making it possible to pull the flange 40 from the operative unit 10. Of course, the operation can be inverted, if the size of the members 80 allows the insertion of the screwdriver in the window 88, removing first the flange 40 from the operative unit 10 and then separating members 80 from flange 40. What has been hereabove disclosed is just a specific embodiment of the invention and it will be obvious to those skilled in the art of the invention to find equivalent solutions all to be meant as herein covered.

I claim:

1. A snap-action fastening device for control and signalling units, comprising an operative unit including an elongated stem having a thread thereon and being insertable into a switchboard from an external front side thereof; a threaded ring nut provided at a rear side of the switchboard and threaded on said stem for fastening said operative unit to the switchboard; said stem including an end portion; and a flange unit receiving said end portion of said stem and including means for receiving an engaging part of a member containing at least one of the control and signalling units, said end portion of said stem being hollow and being provided with at least one longitudinal slot having at a side thereof a bevelled protrusion merging into a recess extending transversely to an axis of elongation of said stem, said flange unit including a flange body, an externally operated ring-shaped lever inserted in said flange body for rotation about said axis of elongation and having a central bore, and means provided in said flange body for biasing said lever in a direction of rotation, said lever including at least one tooth provided at said central bore thereof and inwardly extending therefrom and entering said longitudinal slot upon assembling of said flange unit to said stem of said operative unit, said tooth engaging said bevelled protrusion causing said lever to rotate such that said lever overcomes a force of said biasing means, said tooth being engaged in said recess as said tooth passes over said protrusion and remaining in said recess to ensure fastening of said flange unit and said operative unit, wherein said tooth becomes disengaged from said recess by externally applied rotation of said lever when desired.

2. The fastening device as in claim 1, wherein said end portion is provided with a plurality of longitudinal slots provided with a plurality of bevelled protrusions and a plurality of recesses extending transversely to said axis of elongation and said lever is provided with a plurality of teeth engageable in the corresponding recesses.

3. The fastening device as in claim 2, wherein said slots are circumferentially spaced from each other.

4. The fastening device as in claim 2, wherein two of said slots and two of said teeth are provided.

5. The fastening device as in claim 2, wherein three of said slots and three of said teeth are provided.

6. The fastening device as in claim 2, wherein four of said slots and four of said teeth are provided.

7. The fastening device as in claim 2, wherein said lever is held in a first position by said biasing means and is movable to a second position by a tool externally applying rotation movement to said lever.

8. The fastening device as in claim 2, wherein said flange body has a central passage coaxial with said central bore of said lever and provided at an internal surface thereof with a plurality of protrusions protruding inwardly of said flange body and entering said longitudinal slots of said end portion of said stem for guiding said flange body relative to said stem as said flange unit is fastened to said stem.

9. The fastening device as in claim 8, wherein said protrusions at said internal surface of said passage of said flange body are circumferentially offset from respective teeth of said lever.

10. The fastening device as in claim 9, wherein said means for receiving an engaging part of a member containing at least one of the control and signalling units are formed as plug-in seats on said flange body, said seats being provided on a side of said flange body opposite to that receiving said stem.

11. The fastening device as in claim 9, wherein said seats include slots provided at an upper side and a bottom side of said flange body and projections extending from bottom sides of said slots for engaging fins protruding from said member containing at least one of the control and signalling units.

12. The fastening device as in claim 11, wherein three pairs of said slots are provided in said flange body to receive fins of three members containing the control and signalling units.

* * * * *